US008965044B1

United States Patent
Owechko et al.

(10) Patent No.: US 8,965,044 B1
(45) Date of Patent: Feb. 24, 2015

(54) ROTORCRAFT THREAT DETECTION SYSTEM

(75) Inventors: Yuri Owechko, Newbury Park, CA (US); Swarup S. Medasani, Thousand Oaks, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 924 days.

(21) Appl. No.: 13/160,959

(22) Filed: Jun. 15, 2011

Related U.S. Application Data

(63) Continuation-in-part of application No. 12/456,558, filed on Jun. 18, 2009, now Pat. No. 8,515,126.

(51) Int. Cl.
G06K 9/00 (2006.01)

(52) U.S. Cl.
USPC ........... 382/103; 382/104; 382/224; 382/226; 382/227

(58) Field of Classification Search
USPC ................ 382/103, 104, 224, 226, 227
See application file for complete search history.

(56) References Cited

U.S. PATENT DOCUMENTS

| 6,178,141 | B1 | 1/2001 | Duckworth et al. | |
|---|---|---|---|---|
| 6,434,271 | B1 * | 8/2002 | Christian et al. | 382/194 |
| 6,621,764 | B1 | 9/2003 | Smith | |
| 7,046,187 | B2 | 5/2006 | Fullerton et al. | |
| 7,066,427 | B2 | 6/2006 | Chang | |
| 7,104,496 | B2 | 9/2006 | Chang | |
| 7,110,569 | B2 * | 9/2006 | Brodsky et al. | 382/103 |
| 7,135,992 | B2 | 11/2006 | Karlsson et al. | |
| 7,139,222 | B1 | 11/2006 | Baxter et al. | |
| 7,151,478 | B1 | 12/2006 | Adams et al. | |
| 7,181,046 | B2 * | 2/2007 | Colmenarez et al. | 382/103 |
| 7,190,633 | B2 | 3/2007 | Brinn et al. | |
| 7,266,045 | B2 | 9/2007 | Baxter et al. | |
| 7,292,501 | B2 | 11/2007 | Barger | |
| 7,359,285 | B2 | 4/2008 | Barger et al. | |
| 7,408,840 | B2 | 8/2008 | Barger et al. | |
| 7,558,762 | B2 | 7/2009 | Owechko et al. | |
| 7,586,812 | B2 | 9/2009 | Baxter et al. | |
| 7,599,252 | B2 | 10/2009 | Showen et al. | |
| 7,599,894 | B2 | 10/2009 | Owechko et al. | |
| 7,636,700 | B2 | 12/2009 | Owechko et al. | |
| 7,672,911 | B2 | 3/2010 | Owechko et al. | |
| 8,213,709 | B1 * | 7/2012 | Medasani et al. | 382/155 |
| 8,285,655 | B1 * | 10/2012 | Medasani et al. | 706/14 |
| 8,488,877 | B1 * | 7/2013 | Owechko et al. | 382/165 |

(Continued)

FOREIGN PATENT DOCUMENTS

WO 03093947 A2 11/2003

OTHER PUBLICATIONS

U.S. Appl. No. 12/456,558, filed Jun. 18, 2009, Medesani et al.

(Continued)

Primary Examiner — Matthew Bella
Assistant Examiner — Julian Brooks
(74) Attorney, Agent, or Firm — Yee & Associates, P.C.

(57) ABSTRACT

A method, system, and computer program product for detecting objects. Members of a general class of objects are searched for in a number of images. Members of a specific class of objects are searched for in a number of regions in the number of images where the number of regions contains at least a portion of the members of the general class. A member in the members of the specific class is a potential threat to a rotorcraft.

23 Claims, 15 Drawing Sheets

(56) References Cited

U.S. PATENT DOCUMENTS

| | | | |
|---|---|---|---|
| 8,515,126 B1* | 8/2013 | Medasani et al. | 382/103 |
| 8,589,315 B2* | 11/2013 | Medasani et al. | 706/1 |
| 8,649,565 B1* | 2/2014 | Kim et al. | 382/106 |
| 2005/0182518 A1 | 8/2005 | Karlsson | |
| 2005/0238200 A1 | 10/2005 | Gupta et al. | |
| 2007/0019865 A1 | 1/2007 | Owechko et al. | |
| 2007/0090973 A1 | 4/2007 | Karlsson et al. | |
| 2008/0033645 A1 | 2/2008 | Levinson et al. | |
| 2009/0244309 A1* | 10/2009 | Maison et al. | 348/222.1 |
| 2009/0290019 A1* | 11/2009 | McNelis et al. | 348/143 |
| 2010/0111374 A1* | 5/2010 | Stoica | 382/115 |

OTHER PUBLICATIONS

Kennedy et al., "Swam Intelligence", San Francisco, Morgan Kaufmann Publishers, 2001, Chaper 7, pp. 287-326.

Kennedy et al., "Swarm Intelligence", San Francisco, Morgan Kaufmann Publishers, 2001, Chapter 8, pp. 327-369.

Eberhardt et al., "Particle Swarm Optimization: Developments, Applications, and Resources", Proc. IEEE Congress on Evolutionary Computation, CEC 2001, Seoul, Korea, pp. 81-86.

Holmes et al., "An O(N2) Square Root Unscented Kalman Filter for Visual Simultaneous Localization and Mapping", IEEE Transactions on Pattern Analysis and Machine Intelligence, vol. 31, No. 7, Jul. 2009, pp. 1-13.

Lemaire et al., "Vision Based SLAM: Stereo and Monocular Approaches", International Journal of Computer Vision 74(3) Sep. 2007 pp. 343-364.

Kaess et al., "Probabilistic Structure Matching for Visual SLAM with a Multi-Camera Rig", Computer Vision and Image Understanding, vol. 114, Feb. 2010, pp. 286-296.

Klein et al., "Parallel Tracking and Mapping for Small AR Workspaces", Proc. International Symposium on Mixed and Augmented Reality, pp. 1-10.

"WeaponWatch—Detecting and responding to Enemy weapon Fire at the Speed of Light", Radiance Technologies, pp. 1-2, retrieved May 13, 2010 www.radiancetech.com/products/weaponwatch.htm.

"iRobot and Boston Univ. Photonics Center Unveil Advanced Sniper Detection system for iRobot Packbot", press release Oct. 3, 2005, 1 page, retrieved May 13, 2010 www.irobot.com/sp.cfm?pageid=86&id=170.

* cited by examiner

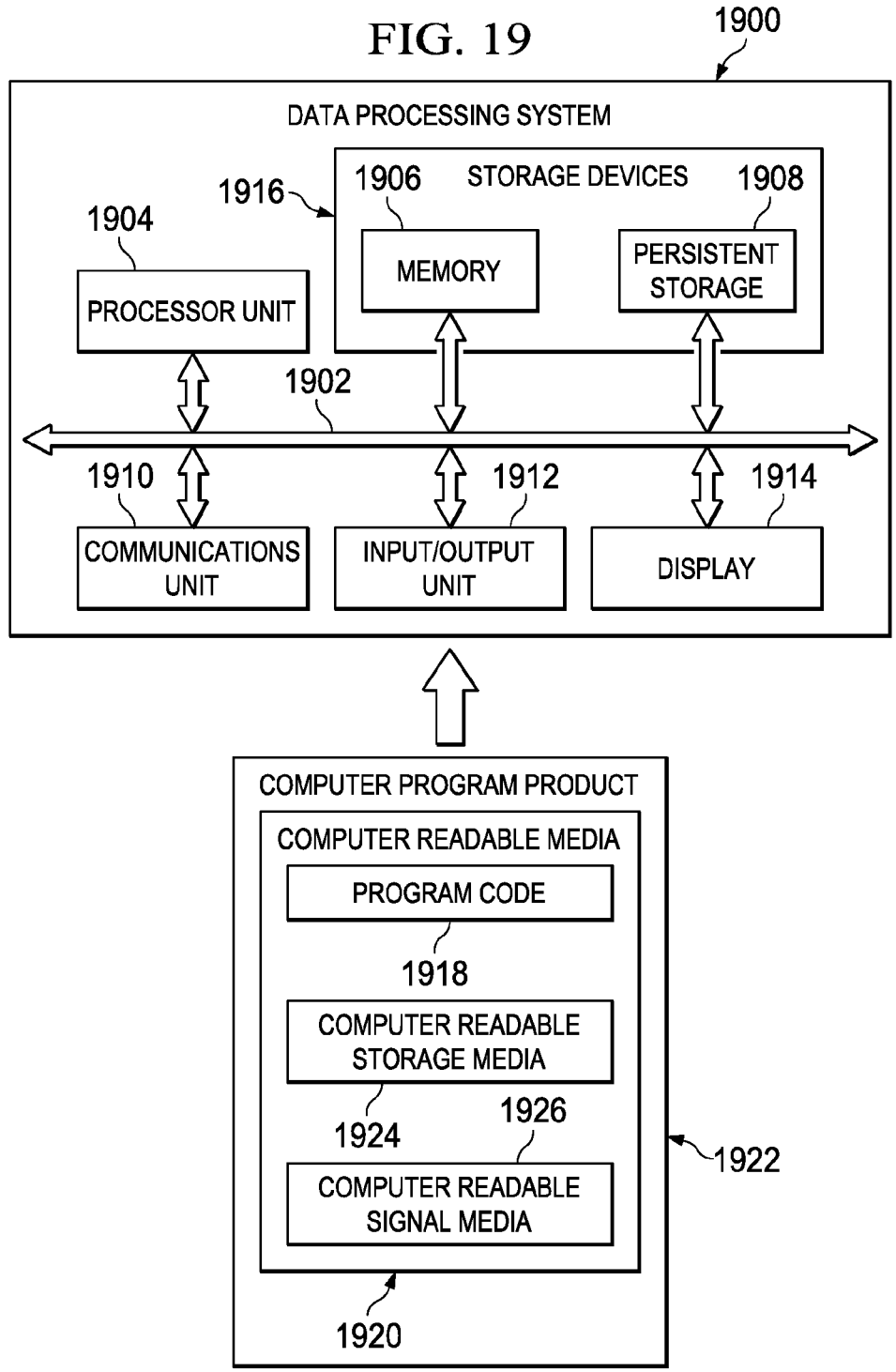

ROTORCRAFT THREAT DETECTION SYSTEM

CROSS-REFERENCE TO RELATED APPLICATION

This application is a continuation-in-part of patent application U.S. Ser. No. 12/456,558, filed Jun. 18, 2009, entitled "Multi-Stage Method for Object Detection Using Cognitive Swarms and System for Automated Response to Detected Objects", now issued as U.S. Pat. No. 8,515,126, which is incorporated herein by reference.

FIELD

The present disclosure relates generally to object detection and in particular to detecting objects in images. Still more particularly, the present disclosure relates to a method and apparatus for detecting objects that are threats to a rotorcraft.

BACKGROUND

Object detection involves determining whether particular objects are present in an image of a sequence of images. These images may be generated by sensors. For example, a camera may generate images in a video stream. One or more of these images may be processed to identify objects in the images.

In object detection, an image is processed to determine whether an object of a particular class is present. For example, a process may be employed to determine if humans are in the images. As another example, the process may determine if buildings, cars, airplanes, and/or other objects are present. Each of these types of objects represents a class. An object that is identified as being in the class is a member of the class.

Current approaches for detecting objects may have issues in identifying members of a class. For example, one object in an image may be falsely identified as a member of a class. In another example, current approaches may fail to identify an object in an image as a member of the class. Some current approaches may attempt to increase the speed that objects are identified. However, in increasing the speed, accuracy in correctly identifying the objects may decrease. In other examples, the amount of time to correctly identify the object may be greater than desired.

Accordingly, it would be advantageous to have a method and apparatus, which takes into account one or more of the issues discussed above as well as possibly other issues.

SUMMARY

In one advantageous embodiment, a method is present for detecting objects. Members of a general class of objects are searched for in a number of images. Members of a specific class of objects are searched for in a number of regions in the number of images where the number of regions contains at least a portion of the members of the general class. A member in the members of the specific class is a potential threat to a rotorcraft.

In another advantageous embodiment, a method is present for detecting threats against a rotorcraft. A number of images are received from a sensor associated with the rotorcraft. Humans are searched for in the number of images using agents configured to search the number of images. A pose that is a potential threat to the rotorcraft is searched for in a number of regions in the number of images. The number of regions contains at least a portion of the humans. An action is initiated when at least one pose that is a potential threat to the rotorcraft is detected.

In yet another advantageous embodiment, a threat detection system comprises a computer system. The computer system is configured to receive a number of images from a sensor. The computer system is configured to search for members of a general class of objects in the number of images. The computer system is configured to search for members of a specific class of objects in a number of regions in the number of images. The number of regions contains at least a portion of the members of the general class. A member in the members of the specific class is a potential threat to a rotorcraft.

In still yet another advantageous embodiment, a computer program product comprises a computer recordable storage media. First program code is present for searching for members of a general class of objects in a number of images. Second program code is present for searching for members of a specific class of objects in a number of regions in the number of images. The number of regions contains at least a portion of the members of the general class. A member in the members of the specific class is a potential threat to a rotorcraft. The first program code and the second program code are stored on the computer readable storage media.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 19 is an illustration of a block diagram of a data processing system in accordance with an advantageous embodiment.

DETAILED DESCRIPTION

Figure 1:
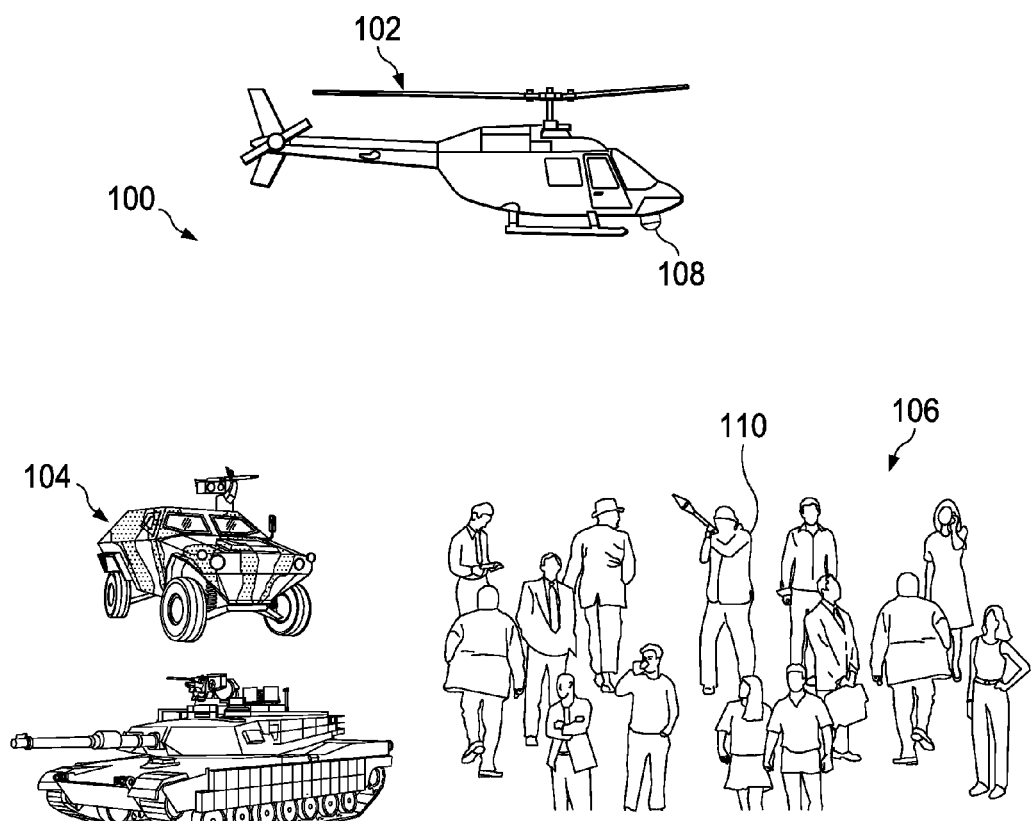
FIG. 1 is an illustration of an object detection environment in accordance with an advantageous embodiment.

The different advantageous embodiments recognize and take into account a number of different considerations. For example, the different advantageous embodiments recognize and take into account that it may be desirable to identify a threat before the threat has occurred. For example, weapons fired at a rotorcraft can pose a threat to the rotorcraft. Thus, it may be desirable to identify the threat before the weapon is fired.

Several advantages are present with detecting threats before a weapon has been fired. Advanced detection of threats allow for actions to be taken before the threat occurs. For example, an alert may be generated if a threat of a weapon is detected before the weapon is fired. If an alert is sounded after an attack occurs, then actions may be limited to defending or evading the attack before responding to the threat. However, advanced detection can provide additional options for responding to the threat. For example, the attack may be prevented.

Current methods of object detection focus on detection of objects by searching the entire image. The different advantageous embodiments recognize and take into account that these types of methods may fail in detecting objects such as a person in a pose with their arms held vertically upward. The different advantageous embodiments recognize and take into account that this type of detection may use a feature detection algorithm tailored to detecting a person in such a pose.

The different advantageous embodiments recognize and take into account object detection algorithms that currently exist for detecting a human form. The different advantageous embodiments recognize and take into account that tailoring these algorithms to detect a human form engaged in a specific position can be very complex. The complexity can increase a processing time of the image without a guarantee of accurate results. The different advantageous embodiments recognize and take into account that such a method is also impractical if the object detection task changes. The changes may require creation of a different specific object detection algorithm.

As an alternative to creating a specific detection algorithm, the different advantageous embodiments recognize and take into account that one could search for the double vertical signatures created by the arm position of the object. However, such a method will likely yield a high false alarm rate since this method will detect all similar vertical signatures in the scene, including signatures from trees, buildings, and other irrelevant objects.

Thus, the different advantageous embodiments provide a method, system, and computer program product for detecting an object. Members of a general class of objects are searched for in a number of images. Members of a specific class of objects are searched for in a number of regions in the number of images where the number of regions contains at least a portion of the members of the general class. A member in the members of the specific class is a potential threat to a rotorcraft. As used herein, a number of items may be one or more items.

With reference now to FIG. 1, an illustration of an object detection environment is depicted in accordance with an advantageous embodiment. Object detection environment 100 is an environment in which advantageous embodiments may be implemented. In this illustrative example, object detection environment 100 includes rotorcraft 102, ground vehicles 104, and crowd 106.

In this example, object detection system 108 searches object detection environment 100 to detect objects that may pose a threat to rotorcraft 102. Object detection system 108 first identifies individual persons in crowd 106 as a general class of objects that may pose a threat to rotorcraft 102. Once crowd 106 has been identified, object detection system 108 then searches for specific individuals in crowd 106 that may pose a threat to rotorcraft 102.

For example, object detection system 108 searches for individuals in crowd 106 in a pose that may be threatening to rotorcraft 102. In this example, person 110 is in a pose with arms raised, pointing a weapon at rotorcraft 102. Object detection system 108 identifies the pose of person 110 as a potential threat to rotorcraft 102. In another example, object detection system 108 may also identify the weapon pointed at rotorcraft 102 as a potential threat.

Once person 110 has been identified as a potential threat, rotorcraft 102 may take action. For example, rotorcraft 102 may issue warnings or take other actions to prevent an attack by person 110. Rotorcraft 102 may also communicate the potential threat and the location of person 110 to ground vehicles 104. Ground vehicles 104 can then respond to the potential threat.

By first narrowing the set of objects in object detection environment 100 that may pose a threat to crowd 106, object detection system 108 can apply tailored algorithms to detect threats in crowd 106. Object detection system 108 does not need to use time applying tailored algorithms to all objects in object detection environment 100.

Instead, object detection system 108 first identifies crowd 106 as a general class of objects that may be a threat to rotorcraft 102. Then, object detection system 108 can spend time searching for specific individuals in crowd 106 that may have a pose or weapon that may be a potential threat to rotorcraft 102.

In this example, object detection system 108 is positioned beneath the fuselage of rotorcraft 102. However, in other advantageous embodiments, object detection system 108 may be positioned in other locations on rotorcraft 102. For example, without limitation, object detection system 108 may be located on the mast, cowl, tail boom, skids, and/or any other suitable locations on rotorcraft 102.

The illustration of object detection environment 100 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, although rotorcraft 102 is illustrated as a helicopter, advantageous embodiments may be applied to other types of aircraft that hover. For example, without limitation, advantageous embodiments may be applied to vertical take-off vehicles, tiltrotors, tiltwing aircraft, and/or any other type of aircraft utilizing powered lift.

In other advantageous embodiments, object detection system 108 may be located remotely from rotorcraft 102. In yet other advantageous embodiments, rotorcraft 102 may respond to the potential threat of person 110 in crowd 106 without assistance from ground vehicles 104.

Figure 2:
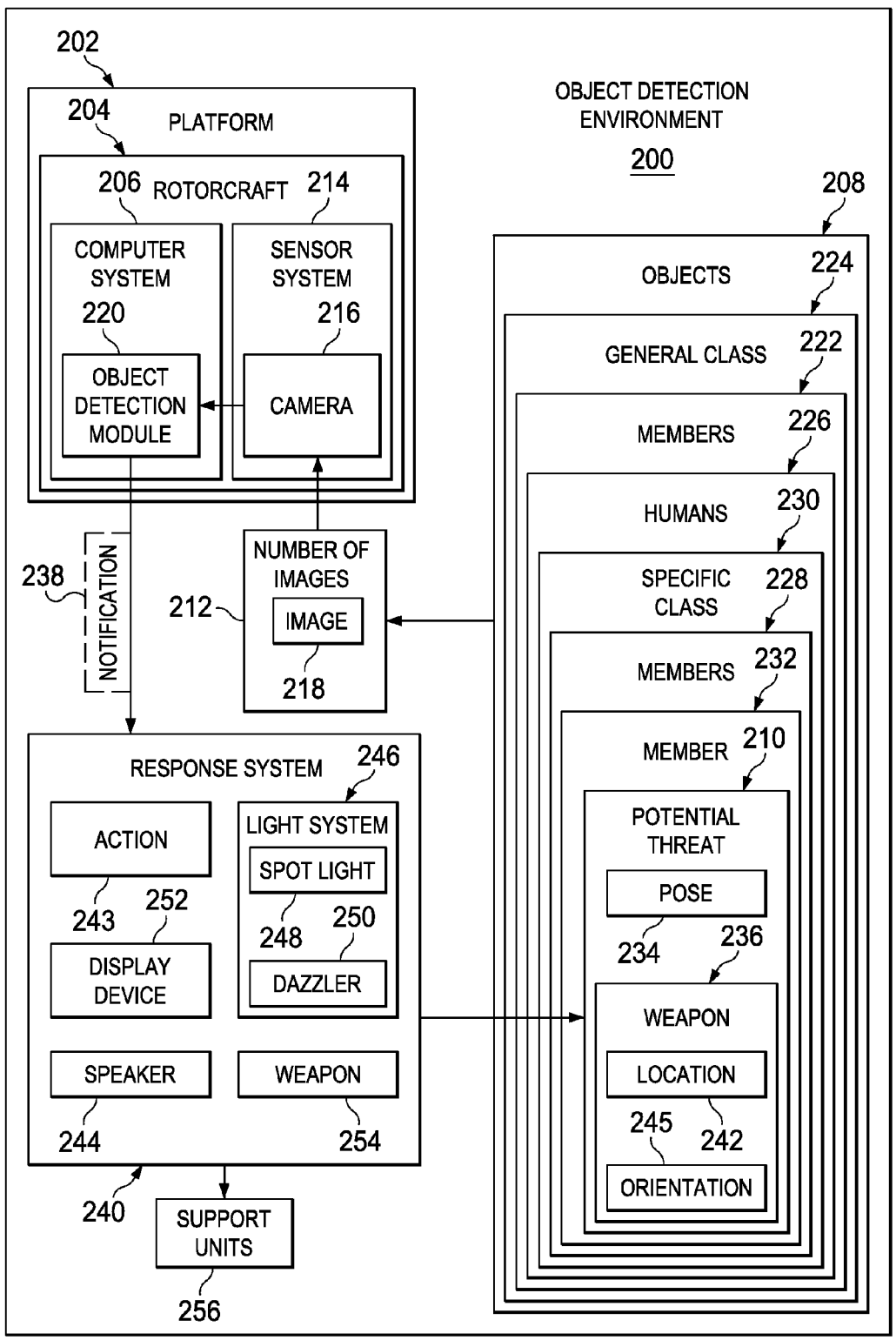
FIG. 2 is an illustration of a block diagram of an object detection environment in accordance with an advantageous embodiment.

With reference now to FIG. 2, an illustration of a block diagram of an object detection environment is depicted in accordance with an advantageous embodiment. Object detection environment 200 is an environment in which advantageous embodiments may be implemented. For example, object detection environment 100 in FIG. 1 is an example of a physical implementation of object detection environment 200 shown in block form in FIG. 2.

Platform 202 exists in object detection environment 200. In this example, platform 202 is rotorcraft 204. In other examples, platform 202 may take other forms. In this example, rotorcraft 204 is associated with computer system 206. Computer system 206 is one or more computers.

A first component may be considered to be associated with a second component by being secured to the second component, included in the second component, fastened to the second component, and/or connected to the second component in some other suitable manner. The first component also may be connected to the second component through using a third component. The first component may also be considered to be associated with the second component by being formed as part of and/or an extension of the second component.

In these advantageous embodiments, computer system 206 identifies objects 208 that may be potential threat 210 to rotorcraft 204. Objects 208 are anything that may exist in object detection environment 200. Sensor system 214 generates number of images 212 of objects 208 in object detection environment 200. For example, without limitation, sensor system 214 may include at least one of an optical sensor, a visible light camera, an infrared camera, and a light detection and ranging unit.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In this example, sensor system 214 includes camera 216. Camera 216 generates image 218 of objects 208. Object detection module 220 is connected to camera 216. Object detection module 220 receives image 218 from camera 216. Object detection module 220 is hardware, software, or a combination of hardware and software in computer system 206. Object detection module 220 processes image 218 to detect objects 208 that may be potential threat 210.

In these advantageous embodiments, object detection module 220 searches image 218 to identify objects 208 that are members 222 of general class 224. For example, general class 224 is humans 226. Members 222 of general class 224 are humans 226 that are present in object detection environment 200.

Once members 222 of general class 224 have been identified, object detection module 220 further processes image 218 and members 222. Object detection module 220 processes the image of members 222 in image 218 to identify members 228 of specific class 230. Specific class 230 may be objects 208 that present potential threat 210 to rotorcraft 204. Members 228 of specific class 230 are members 222 of general class 224 that present potential threat 210 to rotorcraft 204. For example, member 232 of members 228 may have pose 234 controlling weapon 236 in orientation 245. In these examples, controlling a weapon means that the member may be holding a weapon, touching the weapon, standing near the weapon, and/or operating the weapon in some manner. For example, weapon 236 may be located on a platform, such as, for example, a vehicle or a building. Weapon 236 may also be operated by member 232 remotely. For example, without limitation, weapon 236 may be a rocket propelled grenade, a missile launcher, a gun, and/or any other type of weapon that could present potential threat 210 to rotorcraft 204.

In these illustrative examples, pose 234 is a pose that may be threatening to rotorcraft 204. For example, pose 234 may be a human with arms raised toward rotorcraft 204. Thus, object detection module 220 searches members 222 of general class 224 for member 232 in pose 234 having arms raised. In another example, object detection module 220 searches members 222 of general class 224 for member 232 in controlling weapon 236 in orientation 245 and may be potential threat 210 to rotorcraft 204. Weapon 236 in orientation 245, if fired, may threaten rotorcraft 204. In these illustrative examples, object detection module 220 may also search for member 232 in controlling weapon 236 in which orientation 245 is one in which weapon 236 is pointed towards rotorcraft 204.

When potential threat 210 has been identified, object detection module 220 sends notification 238 to response system 240. Object detection module 220 may also include location 242 of potential threat 210 in notification 238. For example, computer system 206 may include a global positioning system for identifying the location of rotorcraft 204. Object detection module 220 can identify a position of potential threat 210 relative to rotorcraft 204 from image 218 to form location 242. In other examples, sensor system 214 may use radar, sonar, lidar, infrared sensors, or some form of proximity sensor to identify location 242 of potential threat 210.

Response system 240 is associated with rotorcraft 204. Response system 240 takes action 243 and responds to potential threat 210. Response system 240 may take actions without user or human input to prevent potential threat 210 from attacking rotorcraft 204. For example, response system 240 may generate an audible warning via speaker 244. In another example, response system 240 may use light system 246. For example, spot light 248 may illuminate member 232 to warn member 232 that member 232 has been identified. In another example, response system 240 may use dazzler 250 to disorient member 232. Dazzler 250 is a device that sends concentrated beams of light towards an individual to disorient the individual.

Response system 240 may also signal location 242 of potential threat 210. For example, spot light 248 can illuminate member 232. Response system 240 may also display location 242 on display device 252.

In these examples, response system 240 signals location 242 so that potential threat 210 can be neutralized. Response system 240 may signal location 242 to an operator of rotorcraft 204. Rotorcraft 204 can evade potential threat 210. Rotorcraft 204 may also fire weapon 254 to respond to potential threat 210. Response system 240 may signal location 242 to support units 256. Support units 256 may include, for example, without limitation, ground forces and/or air forces. Support units 256 can respond to potential threat 210 in assistance of rotorcraft 204. In one example, response system 240 may signal location 242 to a personal head-worn display of one or more of support units 256.

The illustration of object detection environment 200 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Although the different advantageous embodiments have been described with respect to rotorcraft 204, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building, and/or some other suitable object.

In other advantageous embodiments, portions of computer system 206 and/or sensor system 214 may be located remotely from rotorcraft 204. For example, a command center may detect and/or respond to threats for rotorcraft 204. The command center may be mobile or in a fixed location. The command center may process images, such as, for example, satellite images of areas surrounding rotorcraft 204 to detect threats to rotorcraft 204. Information regarding potential threat 210 and location 242 may be sent to rotorcraft 204. The command center may also take action 243 to respond to potential threat 210 for rotorcraft 204.

Figure 3:
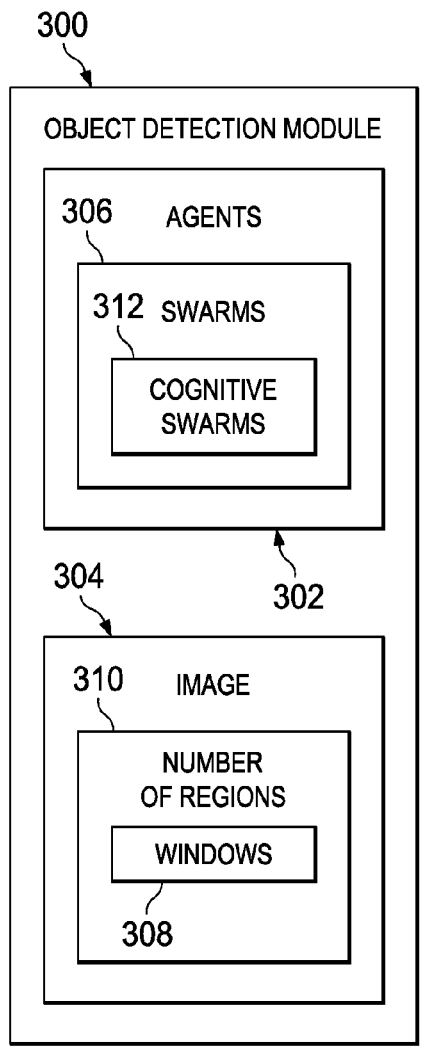
FIG. 3 is an illustration of a block diagram of an object detection module in accordance with an advantageous embodiment.

With reference now to FIG. 3, an illustration of a block diagram of an object detection module is depicted in accordance with an advantageous embodiment. In this advantageous embodiment, object detection module 300 is an example of one implementation of object detection module 220 in FIG. 2.

In this illustrative example, object detection module 300 includes agents 302 that process image 304. Agents 302 are software processes that analyze portions of an image. For example, agents 302 include algorithms for detecting a vector for groups of pixels in image 304. Agents 302 use the vector for the groups of pixels to identify locations and poses of objects in image 304.

In these examples, agents 302 include swarms 306. Swarms 306 are separate processes that process windows 308 in number of regions 310 in image 304. Windows 308 are smaller portions of image 304. Windows 308 in image 304 may be the same size or different sizes. Swarms 306 can process different windows 308 simultaneously. For example, different swarms of swarms 306 may process different objects in image 304. Different swarms of swarms 306 may also process different portions of an object in image 304.

In these illustrative examples, swarms 306 may be cognitive swarms 312. Cognitive swarms 312 are a type of swarms 306 that search for and recognize objects while using a function that has a confidence value for accuracy in correctly identifying objects. Object detection module 300 can utilize cognitive swarms 312 to improve the accuracy of identifying objects in image 304 that may be a threat.

Figure 4:
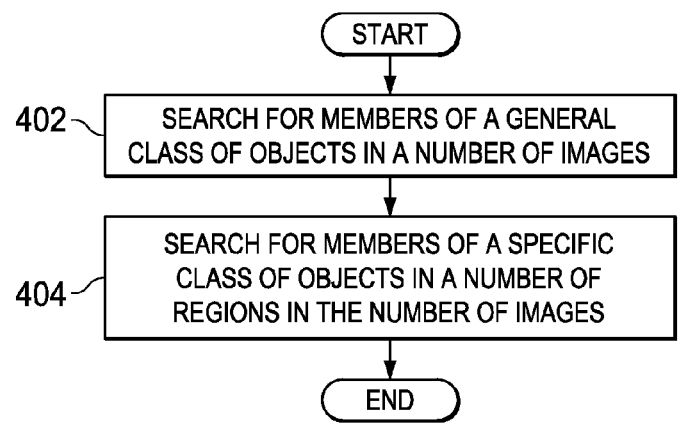
FIG. 4 is an illustration of a diagram of a flowchart of a process for detecting objects in accordance with an advantageous embodiment.

With reference now to FIG. 4, an illustration of a flowchart of a process for detecting objects is depicted in accordance with an advantageous embodiment. The process illustrated in FIG. 4 may be implemented by object detection module 220 in FIG. 2. The process also may be implemented by agents 302 in object detection module 300 in FIG. 3.

The process begins by searching for members of a general class of objects in a number of images (operation 402). In operation 402, the members of the general class of objects may be humans in the number of images. The process then searches for members of a specific class of objects in a number of regions in the number of images (operation 404) with the process terminating thereafter.

In operation 404, the number of regions contains at least a portion of the members of the general class. For example, the number of regions may contain all or a part of a human. Also in operation 404, a member in the members of the specific class is a potential threat to a rotorcraft. For example, the member may have a pose that is threatening to the rotorcraft. In another example, the member may be holding a weapon. The process may identify that the weapon is pointed towards the rotorcraft.

Figure 5:
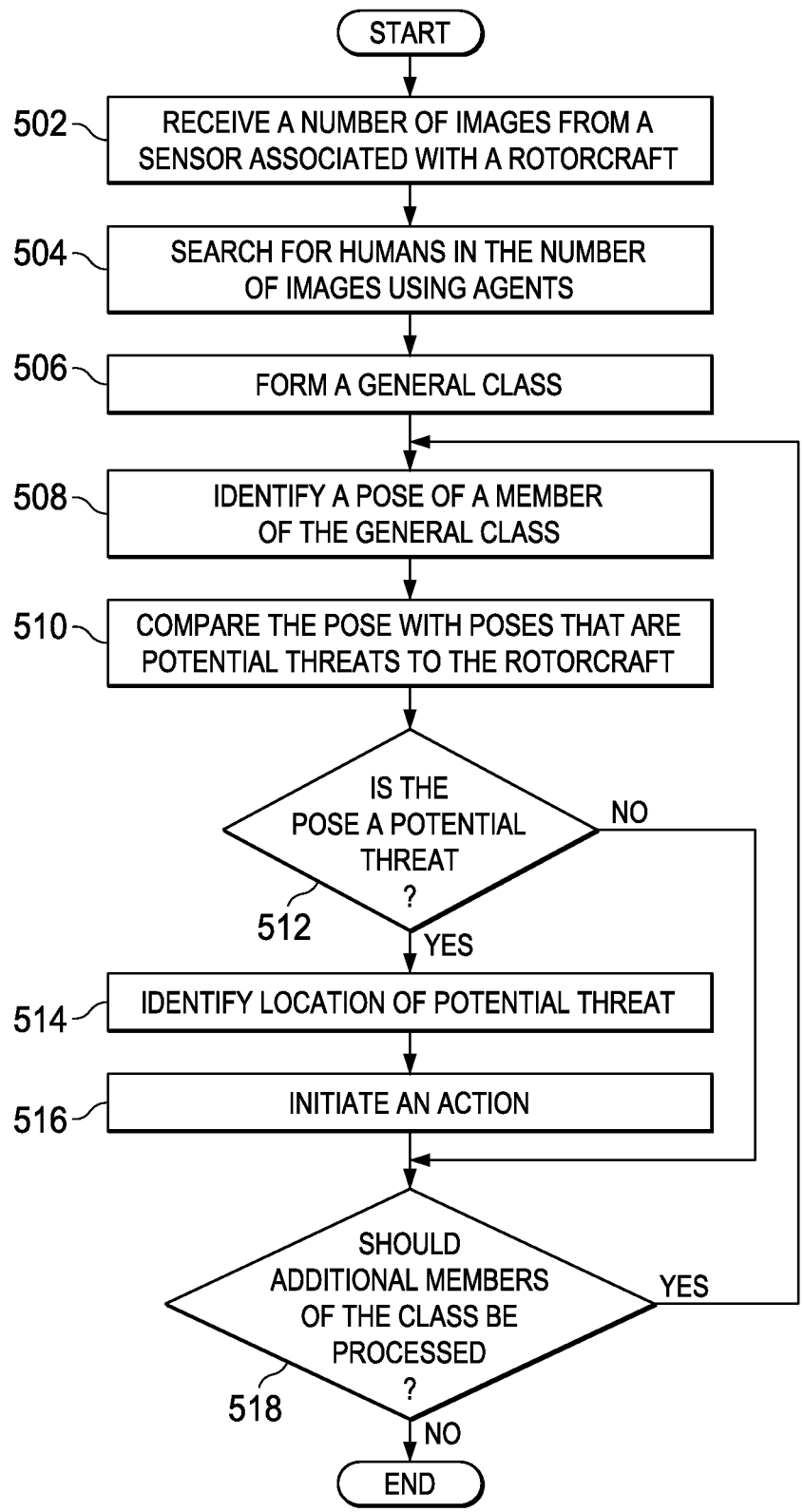
FIG. 5 is an illustration of a flowchart of a process for detecting threats against a rotorcraft in accordance with an advantageous embodiment.

With reference now to FIG. 5, an illustration of a flowchart of a process for detecting threats against a rotorcraft is depicted in accordance with an advantageous embodiment. The process illustrated in FIG. 5 may be implemented by object detection module 220 in FIG. 2. The process also may be implemented by agents 302 in object detection module 300 in FIG. 3.

The process begins by receiving a number of images from a sensor associated with a rotorcraft (operation 502). In operation 502, the sensor may be a camera located on the rotorcraft. In other examples, the sensor may be located remotely from the rotorcraft.

The process then searches for humans in the number of images using agents (operation 504). In operation 504, the agents reduce the number of objects in an image to a general class of objects. Thereafter, the process forms a general class (operation 506). In operation 506, the general class is humans that have been identified in the number of images.

The process then identifies a pose of a member of the general class (operation 508). In operation 508, the agents may process images of one or more members of the general class to identify the pose of the member.

Thereafter, the process compares the pose with poses that are potential threats to the rotorcraft (operation 510). In operation 510, the process narrows the general class of members to a specific class of members that present a potential threat to the rotorcraft. For example, the process searches for poses of members that have their arms raised. In other examples, the process searches weapons positioned in an orientation that is threatening to the rotorcraft. For example, the weapon may be held by a human and pointed at the rotorcraft. In other examples, the weapon may be located on a platform, such as a vehicle or building, for example. The weapon may be controlled by the human.

The process then determines whether the pose is a potential threat (operation 512). In operation 512, the process may determine that the member has arms raised or is controlling a weapon threatening the rotorcraft. If the process determines that the pose is not a potential threat, the process proceeds to operation 518 discussed below. If, however, the process determines that the pose is a potential threat, the process identifies the location of the potential threat (operation 514). In operation 514, the process may send notifications of the location of the potential threat to operators of the rotorcraft and/or ground units to respond to the potential threat.

Thereafter, the process initiates an action (operation 516). For example, without limitation, in operation 516, the action may be to illuminate the member identified as the potential threat, display an alert, project a light on the member, generate a sound directed at the member, obscure a vision of the member, indicate a location of the member, send a message to a ground unit, display a location of the member on a personal head-worn display, display the location of the member on a display device, fire a weapon to neutralize the potential threat, and/or any other type of action to respond to the potential threat.

The process then determines whether additional members of the general class should be processed (operation 518). In operation 518, the process determines whether the potential threat identified is the only potential threat in the number of images. For example, the process may determine whether additional members are present in the specific class of objects that present a potential threat to the rotorcraft. If the process determines that additional members of the general class should be processed, the process returns to operation 508 to identify a pose of another member of the general class. If, however, the process determines that additional members of the general class should not be processed, the process terminates.

The flowchart and block diagrams in the figures illustrate the architecture, functionality, and operation of possible implementations of systems, methods and computer program products according to various advantageous embodiments. In this regard, each block in the flowchart or block diagrams may represent a module, segment, function, and/or a portion of an operation or step. For example, one or more of the blocks may be implemented as program code in hardware or a combination of program code and hardware. When implemented in hardware, the hardware may, for example, take the form of integrated circuits that are manufactured or configured to perform one or more operations illustrated in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order depending upon the functionality involved. Also, other blocks may be added in addition to the illustrated blocks in a flowchart or block diagram.

Figure 6A:
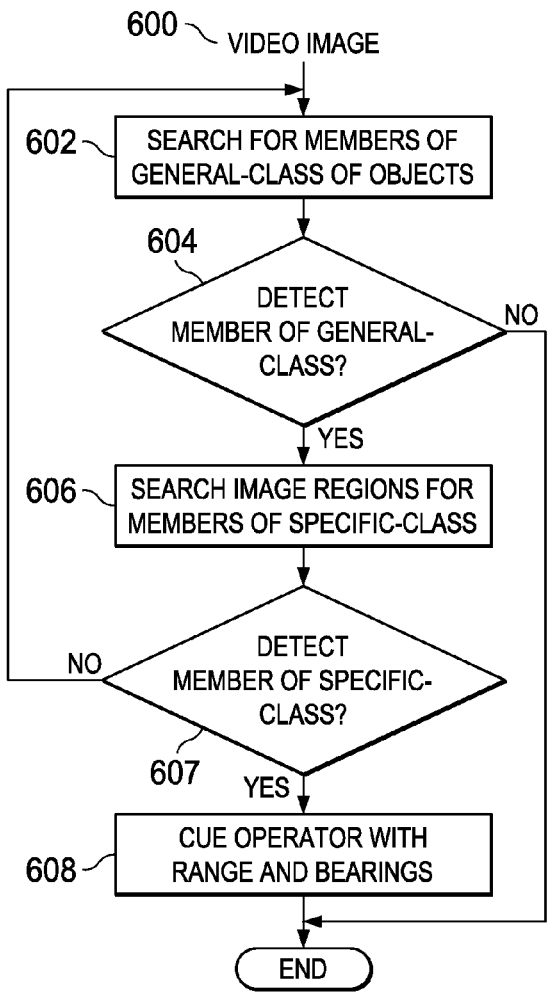
FIG. 6A is an illustration of a flowchart showing a method with respect to generic object detection in accordance with an advantageous embodiment.

FIG. 6A is an illustration of a flowchart showing the method of the present disclosure with respect to generic object detection. In the first stage, video image 600 is searched for members of a predetermined general-class of objects (operation 602). The search may be performed using any of a variety of object detection algorithms known in the art. Next, a determination is made as to whether a member of the general-class of objects is found (operation 604). When a member of the general-class of objects is found, the portion of the image containing the general-class member is sent to a second stage classifier where the image portion is searched for members of a predetermined specific-class of objects (operation 606). When a member of the general-class of objects is not found, the process terminates. In these examples, the general-class of objects may be an example of general class 224 in FIG. 2. Also, for example, the specific-class of objects may be an example of specific class 230 in FIG. 2.

It should be noted that additional search stages beyond the two stages shown may be used if greater search specificity is required. A determination is then made as to whether members of the specific-class are found in the image portions (operation 607). If members of the specific-class are found in the image portions, an operator is cued or alerted as to the location of the objects (operation 608) with the process terminating thereafter. If members of the specific-class are not found in the image portions, the image is further searched for potential general-class members (operation 602). The advantage of the two-stage approach is three-fold: (1) only regions already identified as containing members of the general-class will be searched for members of the specific-class which reduces the false alarm rate; (2) the classifier which detects the specific-class has a more narrowly defined task which improves the detection accuracy; and (3) searching for members of the specific-class only within regions containing members of the general-class uses far fewer computational resources than searching for the members of the specific-class directly over the entire image.

Figure 6B:
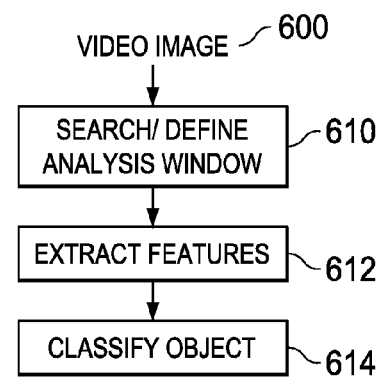
FIG. 6B is an illustration of a flowchart showing a method of object detection in accordance with an advantageous embodiment.

Compared to conventional methods, the two-stage object detection method provides much faster object detection capabilities, as well as the ability to detect an object based on the context of its surroundings. For example, the system is capable of detecting the pose of the person holding a small object when the object itself is too small to be detected directly. The conventional processing flow for recognition of objects in images or video using computer vision consists of three steps, as shown in FIG. 6B.

First, an analysis window is defined to select the portion of video image 600 that is to be analyzed for the presence or absence of the object of interest (operation 610). In these examples, the analysis window may be an example of windows 308 in FIG. 3. The analysis window is scanned or otherwise positioned at various locations in video image 600 in order to find objects. Next, features are extracted from the analysis window that in some way are descriptive of the object of interest (operation 612). A common type of feature is the inner-product of the analysis window with a two-dimensional (2-D) kernel function. A set of feature values from different locations in the analysis window, each of which may use a different kernel function, are combined into a feature vector. Classification of the feature vector as representing an object of interest or non-object of interest is performed (operation 614). These three steps comprise first stage 602 of the present disclosure.

The search or window positioning stage of the specific object detection system in operation 610 can be implemented using cognitive swarms, which is based on particle swarm optimization (PSO). Particle swarm optimization is known in the art and was described by Kennedy, J., Eberhart, R. C., and Shi, Y. in "*Swarm Intelligence*," San Francisco: Morgan Kaufmann Publishers, 2001. Particle Swarm Optimization was also described by R. C. Eberhart and Y. Shi in "Particle Swarm Optimization: Developments, Applications, and Resources," 2001.

Cognitive swarms are a new variation and extension of particle swarm optimization. Cognitive swarms search for and recognize objects by combining particle swarm optimization with an objective function that is based on the recognition confidence. In these examples, the cognitive swarms may be examples of implementations of cognitive swarms 312 in FIG. 3.

Particle swarm optimization is a relatively simple optimization method that has its roots in artificial life in general and to bird flocking and swarming theory in particular. Conceptually, it includes aspects of genetic algorithms and evolutionary programming. A population of potential solutions is maintained as the positions of a set of particles in a solution space where each dimension represents one solution component. Each particle is assigned a velocity vector, and the particles then explore cooperatively the solution space in search of the objective function optima. Each particle keeps track of its coordinates in multi-dimensional space that are associated with the best solution (p) it has observed so far. A global best parameter ($p_g$) is used to store the best location among all particles. The velocity of each particle is then changed towards p and $p_g$ in a probabilistic way according to:

$$v_i(t+1) = wv_i(t) + c_1\phi_1[p_i(t) - x_i(t)] + c_2\phi_2[p_g(t) - x_i(t)],$$

$$x_i(t+1) = x_i(t) + \chi v_i(t+1)$$

where $x_i(t)$ and $v_i(t)$ are the position and velocity vectors at time t of the i-th particle and $c_1$ and $c_2$ are parameters that weight the influence of their respective terms in the velocity update equation, w is a decay constant which allows the swarm to converge to a solution more quickly, $\phi_1$ and $\phi_2$ are random numbers between 0 and 1 that introduce a degree of random exploration, and $\chi$ is a parameter that controls the convergence properties of the swarm.

The above particle swarm optimization dynamics reflect a socio-psychological model where individual particles change their beliefs in accordance with a combination of their own experience and the best experience of the group. This is in contrast to other models of cognition where an individual changes his beliefs to become more consistent with his own experience only. The random element introduces a source of noise which enables an initial random search of the solution space. The search then becomes more directed after a few iterations as the swarm starts to concentrate on more favorable regions.

This type of search is much more efficient than exhaustive or gradient-based search methods. Particle swarm optimization relies on the fact that in most practical problems, the optimum solution usually has better than average solutions residing in a volume around it. These good solutions tend to attract the particles to the region where the optimum lies. The swarm becomes more and more concentrated until the optimum is found (e.g., $p_g$ no longer changes). In cognitive swarms, the particle swarm optimization objective function is the confidence level of an object classifier. The cognitive swarm locates objects of interest in the scene by maximizing the classifier confidence.

Figure 7:
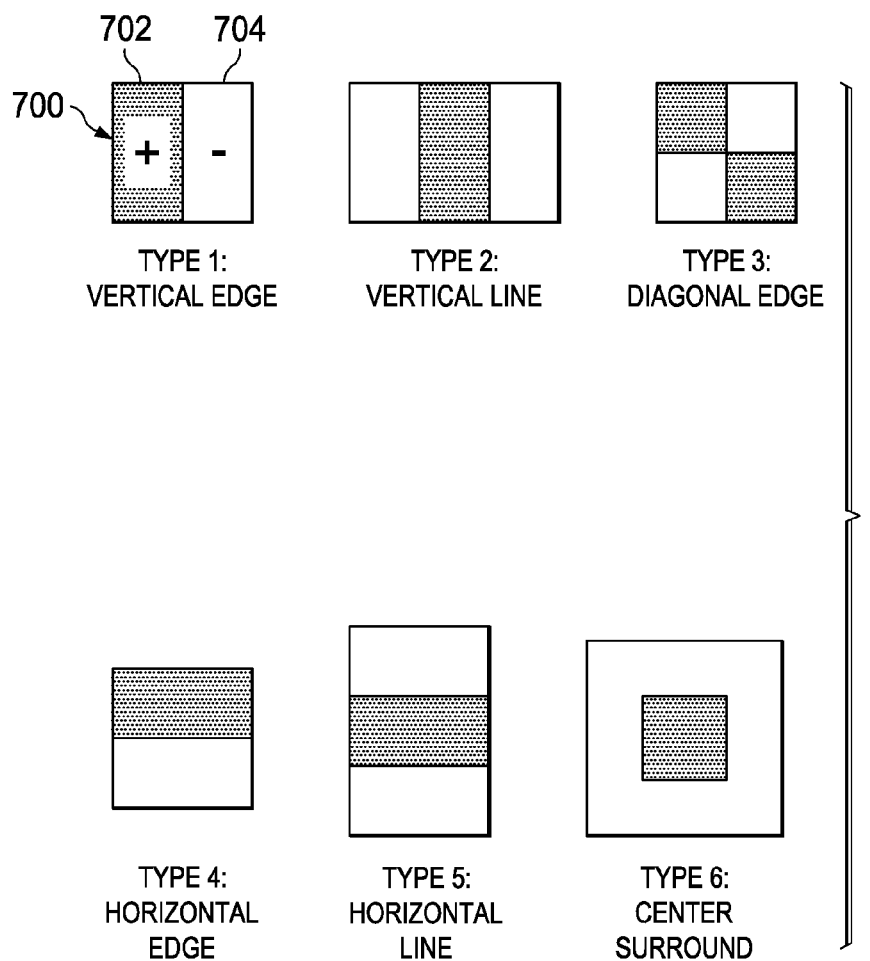
FIG. 7 is an illustration showing Generalized Haar-like Wavelets in accordance with an advantageous embodiment.

The feature extraction and feature value calculation stage 612 can be implemented using various types of features known in the art. As a non-limiting example, FIG. 7 provides an illustration showing various species of Generalized Haar-like Wavelet Features. Each wavelet kernel 700 is divided into positive 702 and negative 704 sections. The wavelet kernel is correlated with the pixel values in the underlying image, and then positive 702 and negative 704 sections are summed to yield a feature value for wavelet kernel 700. Another type of feature that can be used is Threshold Gabor Wavelet Features. Threshold Gabor Wavelets come in two types and are defined as follows:

Gabor Wavelets $$\text{Type 1:} \quad G(x, y) = \exp\left(-\frac{(X^2 + \gamma Y^2)}{2\sigma^2}\right)\cos\left(\frac{2\pi}{\lambda}X\right)$$

$$\text{Type 2:} \quad G(x, y) = \exp\left(-\frac{(X^2 + \gamma Y^2)}{2\sigma^2}\right)\sin\left(\frac{2\pi}{\lambda}X\right)$$

where
$$X = x\cos\theta + y\sin\theta$$
$$Y = -x\sin\theta + y\cos\theta$$

Threshold wavelets are limited to values of $-1$, 0, and 1:

$$G_{TH}(x, y) = \begin{cases} 1 & \text{if } G(x, y) >= tval \\ 0 & \text{if } -tval < G(x, y) < tval \\ -1 & \text{if } G(x, y) < -tval \end{cases}$$

The parameter tval controls how the continuously-valued version of the Gabor wavelet is converted into a thresholded version that assumes values of $-1$, 0, or 1 only. The Threshold Gabor Wavelet has computational advantages because multiplication is not required to calculate the feature values. All of the adjustable parameters in the above equation are optimized for high recognition rate during the classifier development process.

Figure 8:
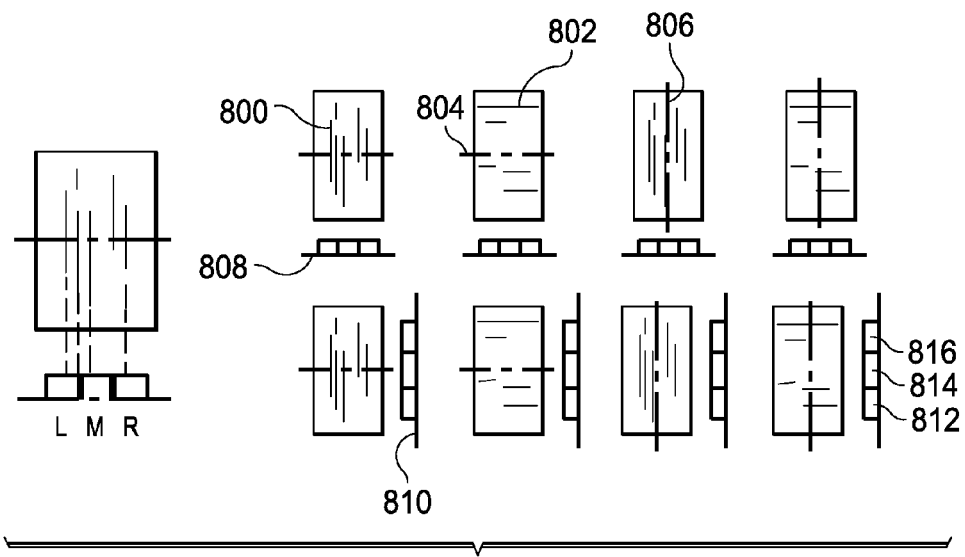
FIG. 8 is a set of illustrations showing the various combinations of Fuzzy Edge Symmetry Features in accordance with an advantageous embodiment.

A third possible feature set is Fuzzy Edge Symmetry Features which is known in the art and shown in FIG. 8. Fuzzy edge symmetry attempts to classify objects based on the symmetries of their edges. The diagram shows an image containing vertical edges 800 and horizontal edges 802 being analyzed against both vertical axes 806 and horizontal axes 804, from both vertical projections 808 and horizontal projections 810, and across the fuzzy membership functions left 812, middle 814, and right 816, yielding (2 edge types)×(2 axes)×(2 projections)×(3 membership functions)=24 dimensional feature. The image illustrated in FIG. 8 is an example of one implementation of image 218 processed by object detection module 220 in FIG. 2.

Figure 9:
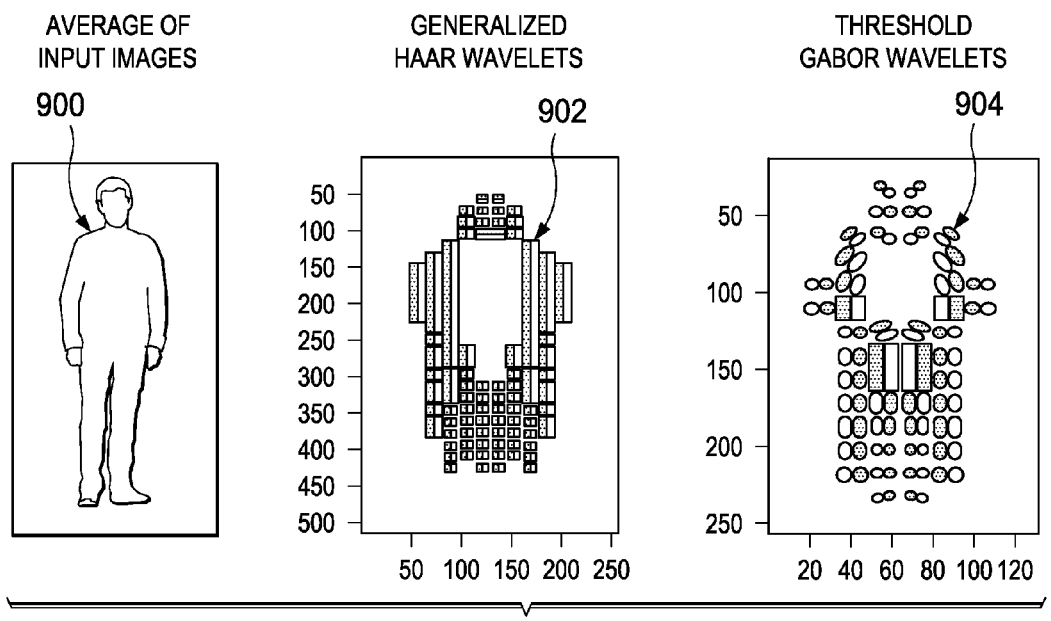
FIG. 9 is a set of illustrations showing the Haar and Thresholded Gabor wavelet features used in the human/non-human classification stage in accordance with an advantageous embodiment.

The feature sets used can be selected by sorting against their importance for a classification task using any of a number of techniques known in the art including, but not limited to, using metrics such as mutual information or latent feature discovery models. The feature sets used for training the first-stage classifiers are different than those used to train the second-stage classifiers. For example, wavelet feature sets for a human/non-human classification stage are shown in FIG. 9.

An image of a potential human 900 is classified by analyzing the image with Haar Wavelets 902 and Threshold Gabor Wavelets 904. Note the feature sets shown in FIG. 9 are only one example of features that can be used for object detection. As understood by one skilled in the art, the appropriate feature set to use for a given object will largely depend on the type of object being detected.

Figure 10:
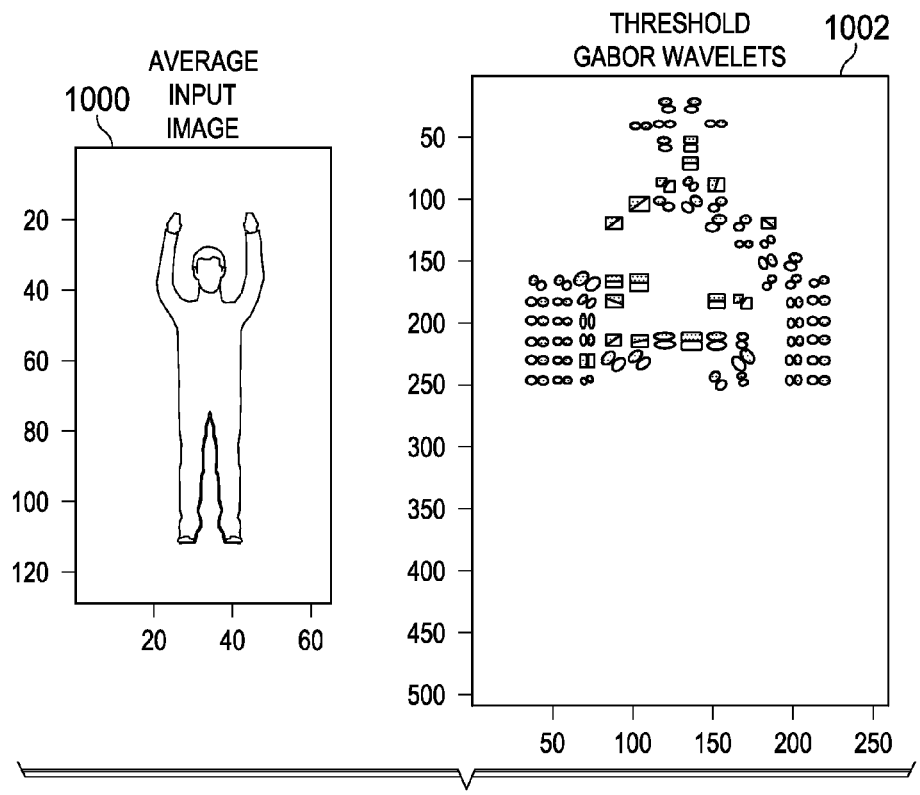
FIG. 10 is a set of illustrations showing the Thresholded Gabor wavelet features used in the specific-class classification stage in accordance with an advantageous embodiment.
Figure 11:
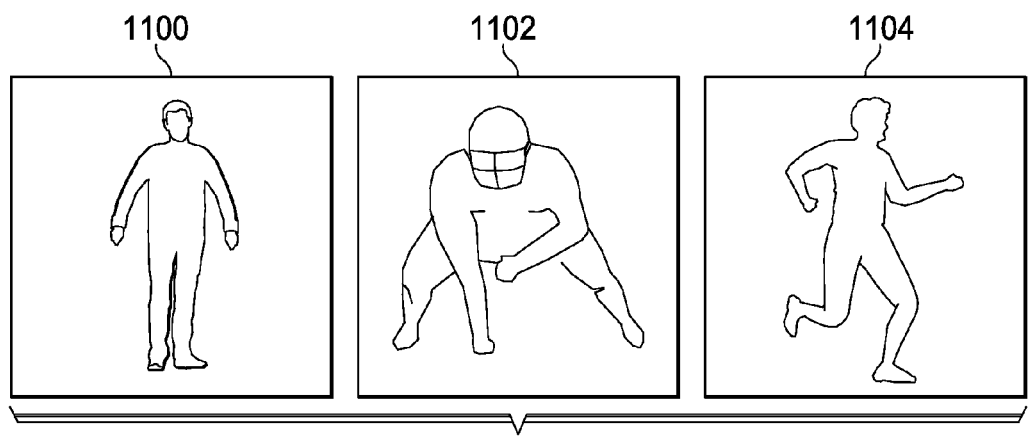
FIG. 11 is a set of illustrations showing example poses for use with the specific-class classification stage in accordance with an advantageous embodiment.

Once an object has been identified as a member of the human class, it is sent to a second-stage classifier to identify the object as a member of a predetermined specific-class. In this case, the predetermined specific-class is a human holding his arms vertically upward, as would a football referee signaling a touchdown. FIG. 10 shows an image of a potential football referee 1000 and an example of a selection of wavelets 1002 for specific object detection that have objective function values above a specified threshold. FIG. 11 is an illustration showing example poses for use with the second-stage of the method according to the present disclosure. The examples shown are a person holding their arms outward 1100, a football player in a three-point stance 1102, and a person running 1104.

Figure 12:
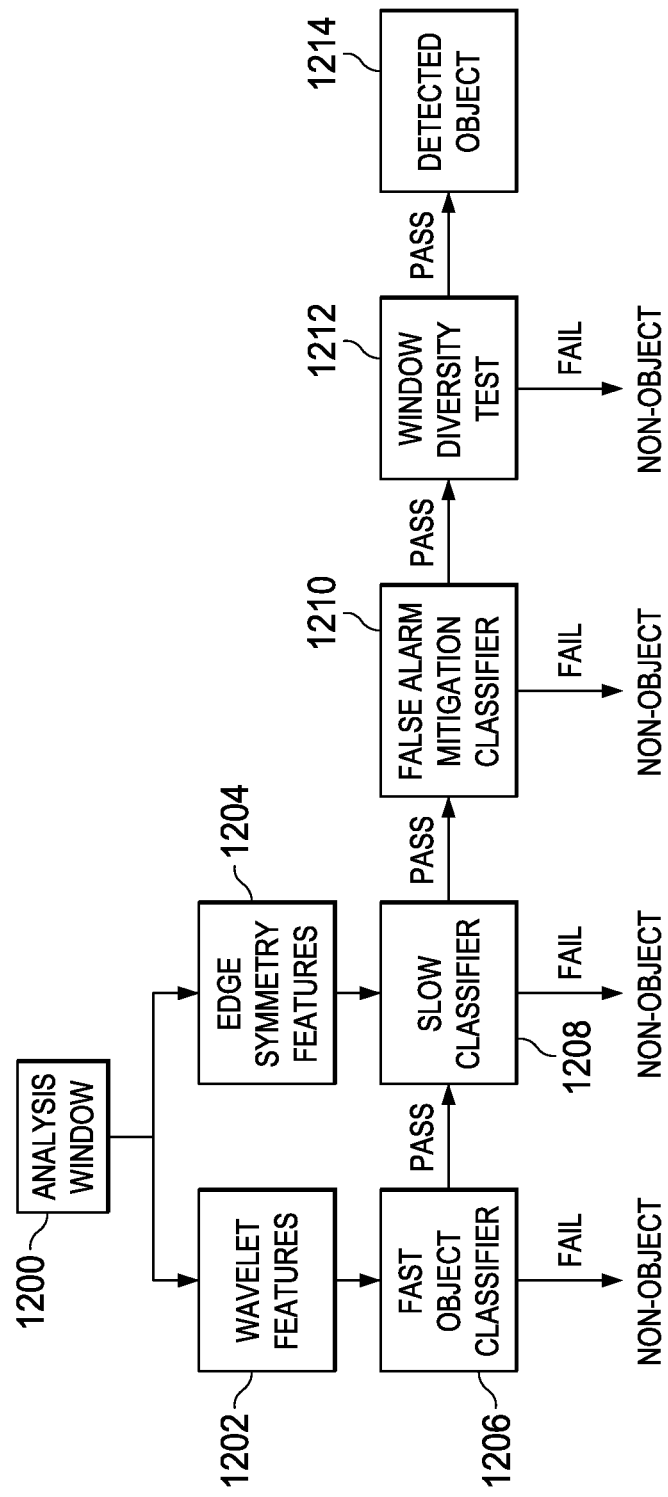
FIG. 12 is an illustration of a flowchart showing a cascade of object classifiers in accordance with an advantageous embodiment.

In order to achieve both high accuracy and speed, a classifier cascade as exemplified in FIG. 12 can be used instead of a single classifier. The cascade of classifiers filters out non-objects of interest in order to achieve both fast response and low false alarm rates. Each classifier is typically a neural network. Other non-limiting examples of classifiers include k-nearest neighbors, support vector machines, and decision trees. In the cascade shown, wavelet features 1202 and edge symmetry features 1204 are extracted from analysis window 1200. Wavelet features 1202 are fed into fast object classifier 1206 which quickly sorts out non-objects and passes on potential objects to slow classifier 1208 which analyzes wavelet features 1202 in conjunction with edge symmetry features 1204.

Potential objects that pass this stage are then fed through false alarm mitigation classifier 1210 and window diversity test 1212 before being output as a detected object 1214. By using less accurate but fast object classifier 1206 in the early stages of the cascade, non-objects of interest images can be quickly rejected. Only candidate images with a higher probability of being true objects of interest are passed on to the later more accurate but also more complex classifiers 1206, 1208, and 1210.

Figure 13A:
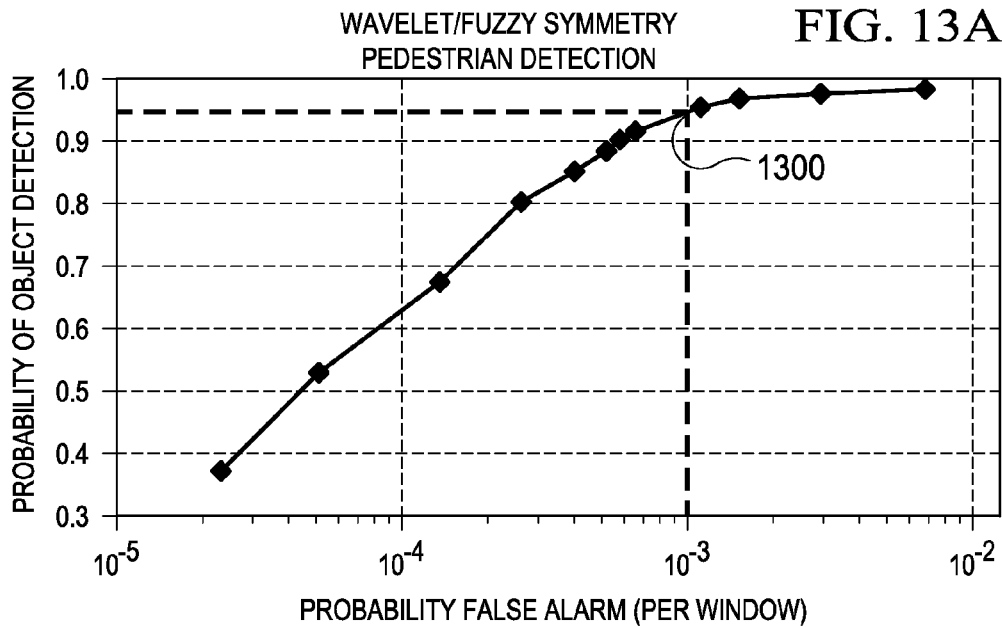
FIG. 13A is an illustration of a data plot showing an experimental detection rate versus false alarm rate for the human detection stage of a method in accordance with an advantageous embodiment.
Figure 13B:
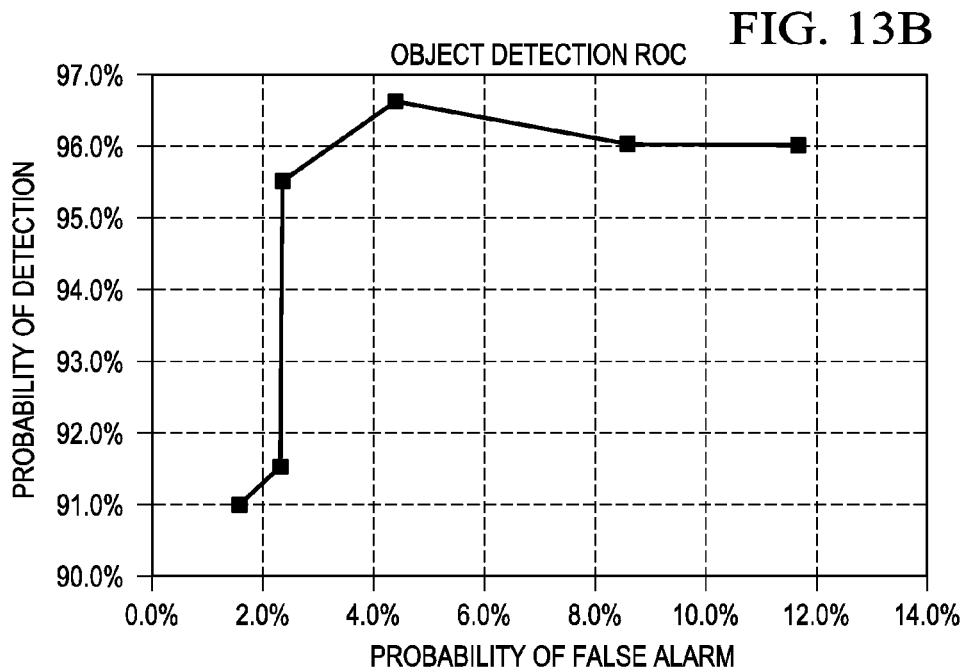
FIG. 13B is an illustration of a data plot showing an experimental detection rate versus false alarm rate for the specific object detection stage of a method in accordance with an advantageous embodiment.

Plots of an experimental detection rate versus false alarm rate for the two-stage classification method of the present disclosure are shown in FIGS. 13A and 13B. FIG. 13A shows optimal performance point 1300 of a human/non-human classifier stage while FIG. 13B shows the performance of the combination of the two classifier cascades (a human/non-human classifier followed by a specific pose/non-pose classifier). A combination of Haar wavelet, edge-symmetry features, threshold Gabor wavelet features, and a neural network classifier were used to obtain the results.

Figure 14:
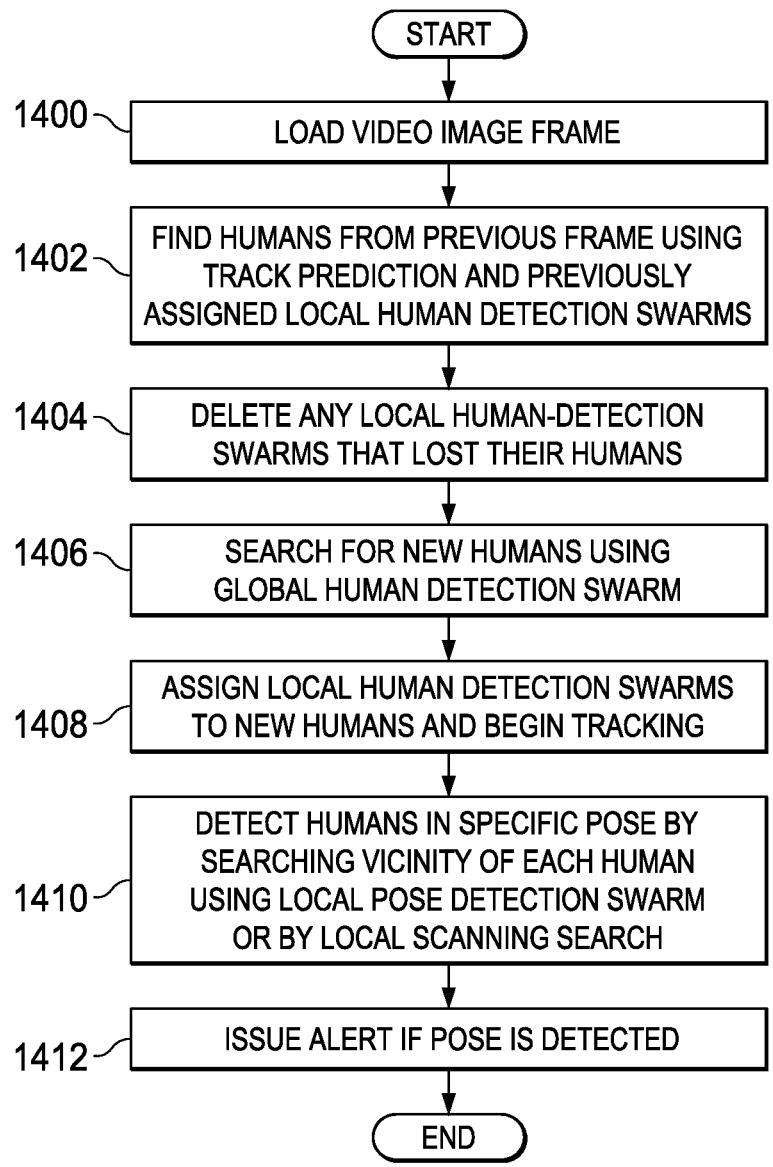
FIG. 14 is an illustration of a flowchart showing the detailed algorithm flow for the object detection system in accordance with an advantageous embodiment.

The detailed algorithm flow for the two-stage detection system is shown in FIG. 14. After loading a video image frame (operation 1400), previously-tracked humans are first detected using local human-classifier cognitive swarms (operation 1402) that were assigned in the previous frame. Any local swarms that are not able to find a human are deleted (operation 1404). A global human-classifier swarm is then used to find any new humans that may have entered the scene (operation 1406). Local swarms are assigned to any new humans (operation 1408).

Humans in a specific pose are then detected 1410 using local pose-classifier cognitive swarms that search the local regions around the humans or, alternatively, by a simple scanning search performed in the local vicinity of the humans. The local search method, which is used, depends on the localization accuracy of the human-classifier cognitive swarms. If the uncertainty is relatively large, then local pose-classifier cognitive swarms should be used. An image must pass through both the human and pose detection stages in order to be recognized as a specific-class object. A visual, audio, or tactile alert is issued when a specific-class object is detected (operation 1412).

Figure 15:
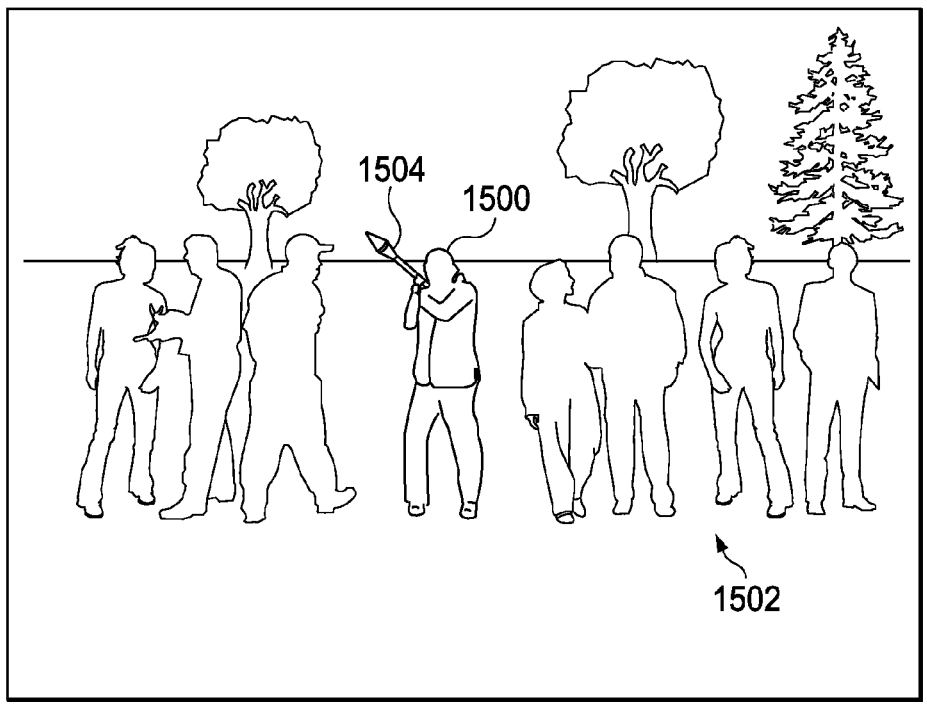
FIG. 15 is an illustration showing a human with their arms in a vertically raised pose holding a weapon detected in a crowd in accordance with an advantageous embodiment.

With reference now to FIG. 15, an illustration of a human with their arms in a vertically raised pose holding a weapon detected in a crowd is depicted in accordance with an advantageous embodiment. Human 1500 in crowd 1502 is holding their arms vertically upward. Human 1500 is also holding weapon 1504. An object detection system, such as, for example, object detection system 108 in FIG. 1 may detect human 1500 in crowd 1502 by virtue of the fact that human 1500 is holding their arms vertically upward. Additionally, an object detection system, such as, for example, object detection system 108 in FIG. 1, may detect human 1500 in crowd 1502 by virtue of the fact that human 1500 is holding weapon 1504.

Figure 16:
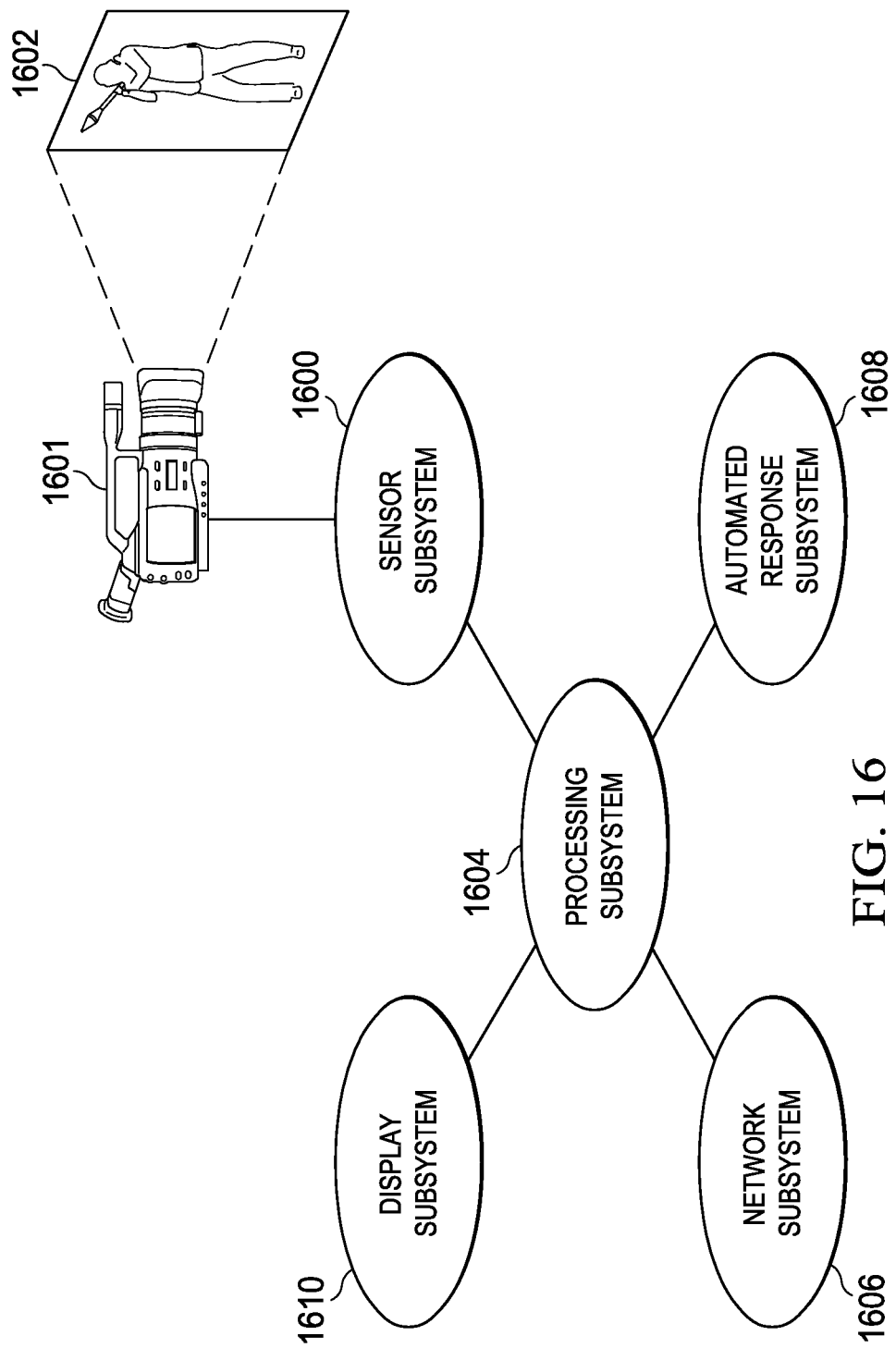
FIG. 16 is an illustration showing the various subsystems in accordance with an advantageous embodiment.

The present disclosure further incorporates the methods described above into a system for display of, and automated response to, detected objects. FIG. 16 provides a detailed view of the system components. Sensor subsystem 1600 consists of optical sensors 1601 used to detect objects of interest 1602. Sensor subsystem 1600 could consist of a single optical sensor or an array of multiple sensors (e.g., cameras). In this example, sensor subsystem 1600 is an example of one embodiment of sensor system 214 in FIG. 2.

One possible array of cameras is an array of six cameras, each with a 60 degrees field of view to provide full coverage across 860 degrees. The images sensed by the cameras are fed into processing subsystem 1604 where the computer vision algorithms described in section (2.0) above are used to detect and identify objects of interest 1602. If multiple sensors are used, the system will also require a networked array of multiple computers in network subsystem 1606 processing the camera images in parallel. Multiple computers in network subsystem 1606 can be connected with a master processor for coordinating results from the network of data processors. When objects of interest are detected, their locations are sent to the two output subsystems (i.e., automated response subsystem 1608 and display subsystem 1610). In this example, automated response subsystem 1608 is an example of one embodiment of response system 240 in FIG. 2.

Automated response subsystem 1608 is an optional component of this system. There may be situations in which a response to identified objects is needed faster than human operators will be able to react to any alert. Non-limiting examples of an automated response subsystem can be automatically re-directing cameras to the location of a recent play in a sporting event, automated contact with law enforcement upon detection of unauthorized personnel, or automated locking/unlocking of doors in a building.

Another system component, as shown in FIG. 16, is display subsystem 1610. Once an object of interest is detected, the system has to inform the operators of the location of the detected object. This information must be presented so it is intuitively and rapidly perceived with minimal cognitive effort. This can be a difficult task in situations where the system is mounted on a rapidly moving vehicle. Typical existing methods of presenting relative location information through synthesized speech will be invalid the moment the vehicle changes direction or even continues forward for a significant distance. Instead, a graphical display method that continuously updates the object location for objects of interest 1602 relative to the rapidly moving vehicle is required.

Figure 17:
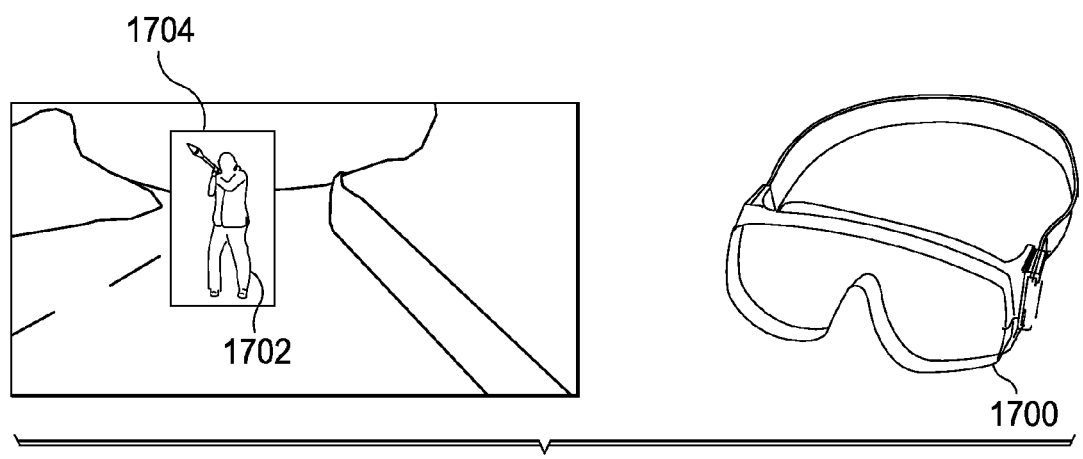
FIG. 17 is an illustration showing an example of a head-worn display worn by an operator for displaying detected object locations in accordance with an advantageous embodiment.

One display option is to illuminate the object with a spotlight. Another display option is to use Augmented Reality technologies to display the object location through personal head-worn displays 1700 worn by the operators, as shown in FIG. 17. Object 1702 is detected and located relative to the operator's current position. For the case of multiple operators in a single moving vehicle, each operator's display is tracked so that their positions and orientations with respect to the vehicle are known. Thus, the system has enough information to draw highlight 1704 in the display directly over where the operator sees object 1702 in the real world.

Figure 18A:
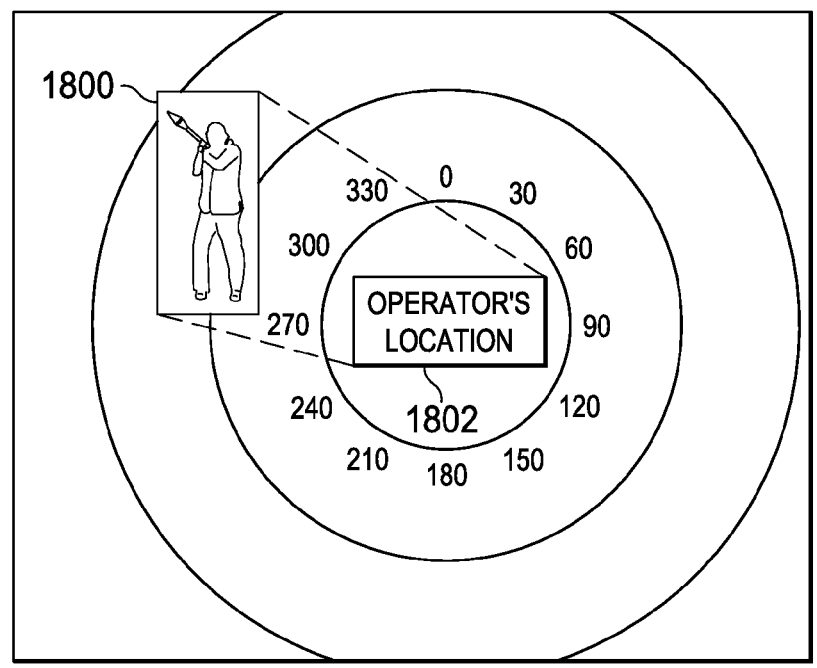
FIG. 18A is an illustration showing a two-dimensional (2-D) flat panel display unit providing a "God's eye" perspective of a detected object's location in accordance with an advantageous embodiment.
Figure 18B:
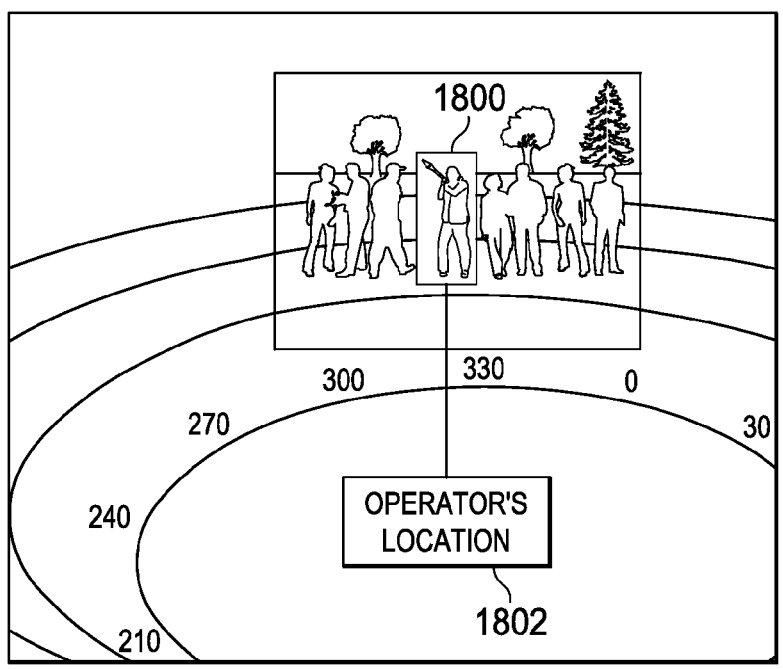
FIG. 18B is an illustration showing a three-dimensional (3-D) flat panel display unit providing a "God's eye" perspective of a detected object's location in accordance with an advantageous embodiment.

A third and more conventional display approach is to display the object information in a head-down display or on a small flat panel display, such as a personal digital assistant (PDA). Possible implementations include two-dimensional (2-D) and three-dimensional (3-D) versions of such a display, as shown in FIGS. 18A and 18B, respectively. Both versions render object position 1800 and operator's location 1802 from a "God's eye" perspective (or any other suitable perspective). The operators can quickly look at either version and understand where the object is relative to their own position. These displays can be continuously updated for use in situations where an operator is continuously changing position or orientation.

Turning now to FIG. 19, an illustration of a block diagram of a data processing system is depicted in accordance with an advantageous embodiment. In this illustrative example, data processing system 1900 includes communications fabric 1902, which provides communications between processor unit 1904, memory 1906, persistent storage 1908, communications unit 1910, input/output (I/O) unit 1912, and display 1914. In these illustrative examples, data processing system 1900 is an example of one implementation of computer system 206 in FIG. 2. Data processing system 1900 is also one example of processing subsystem 1604 in FIG. 16.

Processor unit 1904 serves to process instructions for software that may be loaded into memory 1906. Processor unit 1904 may be a number of processors, a multi-processor core, or some other type of processor, depending on the particular implementation. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device is any piece of hardware that is capable of storing information, such as, for example, without limitation, data, program code in functional form, and/or other suitable information either on a temporary basis and/or a permanent basis. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 is a network interface card. Communications unit 1910 may provide communications through the use of either or both physical and wireless communications links.

Input/output unit 1912 allows for input and output of data with other devices that may be connected to data processing system 1900. For example, input/output unit 1912 may provide a connection for user input through a keyboard, a mouse, and/or some other suitable input device. Further, input/output unit 1912 may send output to a printer. Display 1914 provides a mechanism to display information to a user.

Instructions for the operating system, applications, and/or programs may be located in storage devices 1916, which are in communication with processor unit 1904 through communications fabric 1902. In these illustrative examples, the instructions are in a functional form on persistent storage 1908. These instructions may be loaded into memory 1906 for processing by processor unit 1904. The processes of the different embodiments may be performed by processor unit 1904 using computer implemented instructions, which may be located in a memory, such as memory 1906.

These instructions are referred to as program code, computer usable program code, or computer readable program code that may be read and processed by a processor in processor unit 1904. The program code in the different embodiments may be embodied on different physical or tangible computer readable media, such as memory 1906 or persistent storage 1908.

Program code 1918 is located in a functional form on computer readable media 1920 that is selectively removable and may be loaded onto or transferred to data processing system 1900 for processing by processor unit 1904. Program code 1918 and computer readable media 1920 form computer program product 1922 in these examples. In one example, computer readable media 1920 may be computer readable storage media 1924 or computer readable signal media 1926. Computer readable storage media 1924 may include, for example, an optical or magnetic disk that is inserted or placed into a drive or other device that is part of persistent storage 1908 for transfer onto a storage device, such as a hard drive, that is part of persistent storage 1908. Computer readable storage media 1924 also may take the form of a persistent storage, such as a hard drive, a thumb drive, or a flash memory, that is connected to data processing system 1900. In some instances, computer readable storage media 1924 may not be removable from data processing system 1900. In these illustrative examples, computer readable storage media 1924 is a non-transitory computer readable storage medium.

Alternatively, program code 1918 may be transferred to data processing system 1900 using computer readable signal media 1926. Computer readable signal media 1926 may be, for example, a propagated data signal containing program code 1918. For example, computer readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1918 may be downloaded over a network to persistent storage 1908 from another device or data processing system through computer readable signal media 1926 for use within data processing system 1900. For instance, program code stored in a computer readable storage medium in a server data processing system may be downloaded over a network from the server to data processing system 1900. The data processing system providing program code 1918 may be a server computer, a client computer, or some other device capable of storing and transmitting program code 1918.

In this example, program code 1918 may include program code for detecting threats against a rotorcraft. For example, program code 1918 may include software that is a part of object detection module 220 in FIG. 2.

In some advantageous embodiments, processor unit 1904 is configured to receive images and output locations of detected object. Data processing system 1900 may be further configured to perform the acts of the method of the present disclosure, including: searching for members of a predetermined general-class of objects in an image, detecting members of the general-class of objects in the image, selecting regions of the image containing detected members of the general-class of objects, searching for members of a predetermined specific-class of objects within the selected regions, detecting members of the specific-class of objects within the selected regions of the image, and outputting the locations of detected objects to an operator display unit and optionally to an automatic response system. While data processing system 1900 can be configured for specific detection of humans in certain poses, data processing system 1900 also can be configured for generic object detection.

The different components illustrated for data processing system 1900 are not meant to provide architectural limitations to the manner in which different embodiments may be implemented. The different advantageous embodiments may be implemented in a data processing system including components in addition to, or in place of, those illustrated for data processing system 1900. Other components shown in FIG. 19 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1904 may take the form of a hardware unit that has circuits that are manufactured or configured for a particular use. This type of hardware may perform operations without needing program code to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1918 may be omitted, because the processes for the different embodiments are implemented in a hardware unit.

In still another illustrative example, processor unit 1904 may be implemented using a combination of processors found in computers and hardware units. Processor unit 1904 may have a number of hardware units and a number of processors that are configured to run program code 1918. With this depicted example, some of the processes may be implemented in the number of hardware units, while other processes may be implemented in the number of processors.

As another example, a storage device in data processing system 1900 is any hardware apparatus that may store data. Memory 1906, persistent storage 1908, and computer readable media 1920 are examples of storage devices in a tangible form.

In another example, a bus system may be used to implement communications fabric 1902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1906, or a cache, such as found in an interface and memory controller hub that may be present in communications fabric 1902.

As another example, a storage device in data processing system 1900 is any hardware apparatus that may store data. Memory 1906, persistent storage 1908, and computer readable media 1920 are examples of storage devices in a tangible form.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting objects, the method comprises:
searching for members of a general class of objects in a number of images; and
searching for members of a specific class of objects in a number of regions in the number of images where the number of regions contains at least a portion of the members of the general class, wherein a member in the members of the specific class is a potential threat to a rotorcraft, wherein the searching steps are performed using a cognitive swarm.

2. The method of claim 1 further comprising:
receiving the number of images from a sensor associated with the rotorcraft.

3. The method of claim 2, wherein the sensor is selected from one of an optical sensor, a visible light camera, an infrared camera, and a light detection and ranging unit.

4. The method of claim 1 further comprising:
initiating an action when the member is present from searching for the members of the specific class.

5. The method of claim 4, wherein the action comprises at least one of illuminating the member, displaying an alert, projecting a light on the member, generating a sound directed at the member, obscuring a vision of the member, indicating a location of the member, sending a message to a ground unit, displaying a location of the member on a personal head-worn display, and displaying the location of the member on a display device.

6. The method of claim 1, wherein the general class of objects is humans and the specific class of objects is a pose that is a threat to the rotorcraft.

7. The method of claim 6, wherein the pose is aiming a weapon selected from one of a rocket propelled grenade, a missile launcher, and a gun.

8. The method of claim 6, wherein the specific class of objects is selected from one of a weapon controlled by a human and the weapon positioned in an orientation that is threatening to the rotorcraft.

9. The method of claim 1, wherein searching for the members of the general class of objects in the number of images comprises:
    searching for the members of the general class of objects in the number of images using agents configured to search the number of images for the members of the general class of objects.

10. A method for detecting threats against a rotorcraft, the method comprises:
    receiving a number of images from a sensor associated with the rotorcraft,
    searching for humans in the number of images using agents configured to search the number of images for the humans;
    searching for a pose that is a potential threat to the rotorcraft in a number of regions in the number of images where the number of regions contains at least a portion of the humans; and
    initiating an action when the pose that is the potential threat to the rotorcraft is detected.

11. The method of claim 10, wherein the searching steps are performed using a cognitive swarm.

12. The method of claim 10, wherein the pose that is the potential threat to the rotorcraft indicates that a human is aiming a weapon at the rotorcraft.

13. The method of claim 12, wherein the sensor is selected from one of an optical sensor, a visible light camera, an infrared camera, and a light detection and ranging unit; wherein the action comprises at least one of illuminating the human, displaying an alert, projecting a light on the human, generating a sound directed at an object, obscuring a vision of the human, indicating a location of the human, sending a message to a ground unit, displaying a location of the human on a personal head-worn display, and displaying the location of the human on a display device; and wherein the pose is aiming a weapon selected from one of a rocket propelled grenade, a missile launcher, and a gun.

14. A threat detection system comprising:
    a computer system configured to receive a number of images from a sensor; search for members of a general class of objects in the number of images; and search for members of a specific class of objects in a number of regions in the number of images where the number of regions contains at least a portion of the members of the general class, wherein a member in the members of the specific class is a potential threat to a rotorcraft, wherein the computer system is configured to use a cognitive swarm to search for the members of the general class of objects in the number of images.

15. The threat detection system of claim 14 further comprising:
    the sensor, wherein the sensor is selected from one of an optical sensor, a visible light camera, an infrared camera, and a light detection and ranging unit.

16. The threat detection system of claim 14 further comprising:
    the rotorcraft, wherein the sensor and the computer system are connected to the rotorcraft.

17. The threat detection system of claim 14, wherein the computer system is further configured to initiate an action when at least one member is present from searching for the members of the specific class.

18. The threat detection system of claim 14, wherein the general class of objects is humans and the specific class of objects is a pose that is a threat to the rotorcraft, and wherein the pose is aiming a weapon selected from one of a rocket propelled grenade, a missile launcher, and a gun.

19. The threat detection system of claim 14, wherein the computer system is configured to search for the members of the general class of objects in the number of images using agents configured to search the number of images for the members of the general class of objects.

20. A computer program product comprising:
    a non-transitory computer readable storage media;
    first program code for searching for members of a general class of objects in a number of images, the searching using a cognitive swarm; and
    second program code for searching for members of a specific class of objects in a number of regions in the number of images where the number of regions contains at least a portion of the members of the general class, wherein a member in the members of the specific class is a potential threat to a rotorcraft and the first program code and the second program code are stored on the computer readable storage media.

21. The computer program product of claim 20 further comprising:
    third program code for initiating an action when the member is present from searching for the members of the specific class, wherein the action comprises at least one of illuminating the member, displaying an alert, projecting a light on the member, generating a sound directed at the member, obscuring a vision of the member, indicating a location of the member, sending a message to a ground unit,
    displaying a location of the member on a personal head-worn display, and display the location of the member on a display device.

22. The computer program product of claim 20, wherein the general class of objects is humans and the specific class of objects is a pose that is a threat to the rotorcraft and wherein the specific class of objects is selected from one of a weapon controlled by a human and the weapon positioned in an orientation that is threatening to the rotorcraft.

23. The computer program product of claim 20, wherein the first program code for searching for the members of the general class of objects in the number of images comprises:
    program code for searching for members of the general class of objects in the number of images using agents configured to search the number of images for the members of the general class of objects.

* * * * *